Figure 2:
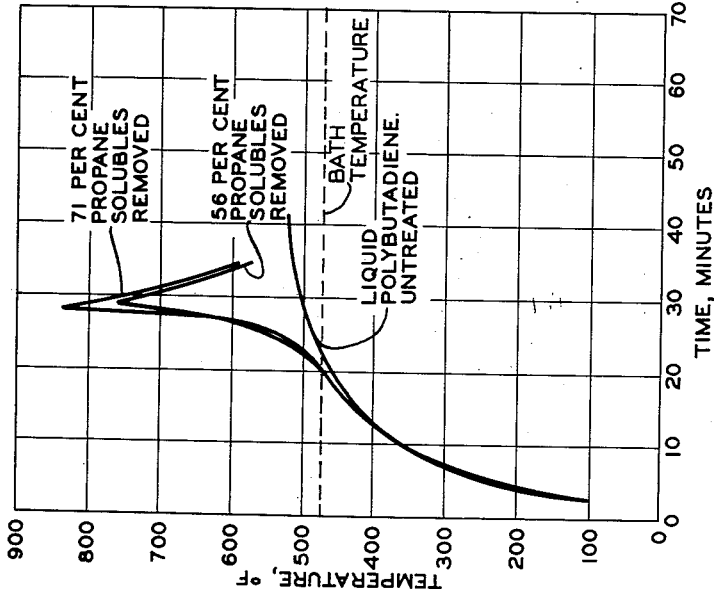

Jan. 23, 1962   C. E. WHEELOCK   3,018,277
EXTRACTING A LIQUID DIENE POLYMER WITH A LIQUID HYDROCARBON
AND METHOD OF PREPARING CASTING OF SAID
EXTRACTED DIENE POLYMER
Filed Jan. 31, 1955

INVENTOR.
CHARLES E. WHEELOCK
BY Hudson & Young
ATTORNEYS

United States Patent Office 3,018,277
Patented Jan. 23, 1962

3,018,277
EXTRACTING A LIQUID DIENE POLYMER WITH A LIQUID HYDROCARBON AND METHOD OF PREPARING CASTING OF SAID EXTRACTED DIENE POLYMER
Charles E. Wheelock, Bartlesville, Okla., assignor to Phillips Petroleum Company, a corporation of Delaware
Filed Jan. 31, 1955, Ser. No. 485,050
11 Claims. (Cl. 260—93.5)

This invention relates to improved castings from liquid polymers. In one of its aspects, this invention relates to void free castings from liquid polymers of conjugated dienes. In a more specific aspect, this invention relates to void free castings produced from liquid polybutadiene.

In recent years, considerable work has been done in preparing liquid polymers of conjugated dienes. These liquid polymers can be prepared by any method known in the art such as by emulsion polymerization but most frequently these liquid polymers are prepared by sodium catalyzed mass polymerization. For example, it is known in the art that conjugated dienes can be polymerized under certain conditions to form liquid polymers. Liquid polymer refers to polymerized conjugated dienes having a viscosity in the range of 100 to 6000 Sabolt Furol seconds at 100° F. and generally having a molecular weight in the range between 300 and 3000. The preceding specifications for liquid polymers refer to liquid polymers of conjugated dienes after all solvent has been removed, but before they have been extracted by the process of this invention, as the viscosity of the extracted polymer is considerably higher than the viscosity of the polymer before extraction. The liquid polymer can be obtained by such known methods as mass or emulsion polymerization. One method for producing such liquid polymers is disclosed in U.S. Patent 2,631,175.

While polymers of conjugated dienes as described above are useful in the fields of drying oils, coatings, adhesives and rubber compounding, the material cannot be used, as such, as a satisfactory material for castings, since castings prepared directly from polymers of conjugated dienes, as described above, contain a large number of voids. These voids are believed to be due to volatile components present in the liquid polymer which vaporize during the casting or heat setting process thus causing vapor bubbles. This void formation occurs even with polymers from which all solvent which was present during the polymerization step has been carefully removed.

An object of this invention is to provide a method for increasing the activity of liquid polymers of conjugated dienes.

Another object of this invention is to provide a method of preparing void free castings.

Another object of this invention is to provide a method of treating liquid polymers of conjugated dienes.

Another object of this invention is to provide a method for improving the quality of a casting prepared from a liquid polymer of a conjugated diene.

Still another object of this invention is to provide a method for producing void free castings from liquid polybutadiene.

Other objects, advantages and features of this invention will be obvious to those skilled in the art having been given this disclosure.

According to this invention, solid resins are prepared by heating a liquid polymer of a conjugated diene which has been extracted with a liquefied paraffin or monoolefin containing from one to five carbon atoms per molecule. A liquid polymer of a conjugated diene which has been treated until from one to 75 percent by volume of the total starting material is removed is much more active than untreated liquid polymers. Void free castings can be produced by heating the treated liquid polymer whereas voids are generally present in solid resins produced by heating untreated liquid polymers. The treated material is also suitable for the production of laminates.

The process of this invention is applicable to liquid polymers (including homopolymers and copolymers) of a conjugated diene. These dienes can be polymerized alone, with other conjugated dienes, or with one or more other copolymerizable materials. However, when copolymers are prepared, at least 50 weight percent of the charged monomers (monomers charged to the polymerization reaction) should be conjugated dienes. The preferred conjugated dienes are those which contain from four to six carbon atoms per molecule, but those containing more carbon atoms per molecule, e.g., eight can also be used. Examples of such conjugated dienes include 1,3-butadiene, isoprene, piperylene, methylpentadiene, 2,3-dimethyl-1,3-butadiene and the like. Monomers copolymerizable with such conjugated dienes include unsaturated comonomers such as styrene, alpha-methylstyrene, alpha-methyl-para-methylstyrene, halogenated styrenes such as 2-chloro-styrene and 3-bromo-styrene, acrylonitrile, methacrylonitrile, acrylic and methacrylic acid esters such as methyl acrylate and methyl methacrylate, fumaric acid esters such as ethyl fumarate, unsaturated ketones such as methyl vinyl ketone and methyl isopropenyl ketone, and similar copolymerizable monomers.

As has been indicated, methods for preparing liquid homopolymers and copolymers from conjugated dienes are known in the art. However, my invention is not dependent upon the method of preparing the liquid polymer and such liquid polymers prepared by any method known to the art can be treated by the method of this invention.

In particular, this invention is applicable to liquid homopolymers or copolymers of 1,3-butadiene which will be referred to in this specification as a liquid polymer of butadiene. The liquid polymers of a conjugated diene polymerized either alone or with one or more copolymerizable materials will be referred to as a liquid polymer of a conjugated diene. It should be understood, that such liquid polymers are prepared by polymerizing at least 50 parts by weight of conjugated dienes per 100 parts of total monomers.

In the practice of this invention the liquid polymer is treated in a liquid-liquid extraction operation using as the solvent a liquefied hydrocarbon gas of a paraffin or monoolefin containing from one to five carbon atoms per molecule to remove from one to 75 percent by volume of the polymer being treated. Solvents used for the extraction include methane, ethane, propane, butane, isobutane, pentane, isopentane, ethylene, propene, butene, isobutene, pentene, isopentene, and mixtures of any of these compounds. It is understood that sufficiently low temperatures and/or high pressures should be used to keep the solvent in the liquid phase. Liquid polymers thus treated are much more rapid gelling than are the untreated liquid polymer thus indicating greater activity. During the reaction for the production of solid products, heat is evolved at a more rapid rate from the extracted material than from the untreated polymer as is shown by the figures and discussed under the examples. In most instances optimum activity can be achieved by extracting from 15 to 35 percent by volume of the liquid polymer. As hereinbefore mentioned, in addition to the increase in activity realized through extraction of the liquid polymer, void free castings can be produced from it while voids are present in castings prepared from the untreated polymer. The efficiency of contact, particular solvent and liquid polymer, temperatures, etc. will influence the ratio of solvent to polymer requirement to obtain the desired degree of extraction. In general, a volume ratio of solvent to polymer in the range of 10:1 to 50:1 will give the desired results.

After extraction of the liquid polymer, the raffinate phase is recovered and solvent is separated from the polymer by stripping in any suitable manner. It is usually preferred to strip under vacuum at somewhat elevated temperatures. Just prior to casting the polymer is generally placed in a vacuum of around 5 to 20 mm. Hg and warmed to around 160 to 175° F. for a period of 15 minutes to one hour to remove traces of volatile matter, such as dissolved gases. It is necessary that this volatile matter be removed in order that the solid resins produced will be free from voids.

When preparing castings from the treated liquid polymer, the polymer is generally heated to a temperature in the range between 340 and 540° F., preferably between 420 and 540° F., for a period in the range between 0.5 and 100 hours, preferably between 2 and 10 hours. It is within the scope of this invention to use curing catalyst such as metal naphthenates, peroxides and the like, if desired. At a given temperature with a given resin, there is an optimum heating time which will give the maximum strength. In order to obtain a resin with maximum strength, it is necessary that the heating time be determined for the conditions used with a particular resin. The products obtained after heating are hard, infusible (thermoset) bodies.

I will further illustrate the process of this invention using liquid polybutadiene as the particular liquid polymer and propane as the extraction solvent. However, it should be understood that liquid polymers as disclosed can be improved by treatment with any of the solvents as disclosed. The liquid polybutadiene is a preferred species since such liquid polymers of 1,3-butadiene can be readily available since 1,3-butadiene is widely used in the synthetic rubber industry. Liquefied propane, butane, and pentane are our preferred extraction mediums since they are readily available and non-polymerizable and maintained in the liquid state without the use of expensive cooling and/or pressure conditions.

*Example I*

Liquid polybutadiene, prepared by mass polymerization, using finely divided sodium as a catalyst, and having a viscosity of 1390 Saybolt Furol seconds at 100° F., 0.6 weight percent volatile matter and a Gardner color of 11, was fractionated by liquid-liquid propane extraction. The extraction was made isothermally in a continuous 4 foot x 3 inch diameter column. The raffinate phase was drawn directly from the column and the propane stripped from it under vacuum using a glass flask. The maximum temperature during the stripping operation was 300° F. The extract phase was removed. Operating conditions, yield and inspection data on products and charge are given in the following table:

```
Operating conditions:
  Feed rates, gallons per hour at 60° F.—
    Propane----------------------------------------- 14.25
    Polybutadiene--------------------------------- 0.489
  Ratio, propane/polybutadiene, volume------------- 29.2/1
  Temperatures, ° F.—
    Top column-------------------------------------- 108
    Polybutadiene inlet---------------------------- 104
    Column at propane inlet----------------------- 108
    Propane inlet---------------------------------- 108
    Bottom settling section----------------------- 107
```

Inspection data (on solvent free basis):

| | Charge | Overhead | Bottoms |
|---|---|---|---|
| Refractive Index, 70° C. | 1.5003 | 1.4855 | 1.5053 |
| Specific Gravity, 60/60° C. | 0.9107 | 0.8858 | 0.9211 |
| Viscosity, SUS at 210° F. | 817 | 65.9 | 4592 |

```
Yield of raffinate:
  Calculated from specific gravity, volume percent-- 70.5
  Calculated from refractive index, volume percent-- 74.8
```

A sample of the raffinate was placed under vacuum (approximately 10 mm. Hg) and warmed to 160–175° F. for 30 minutes to remove the last trace of volatile matter which may have remained. This material was placed in a tube and heated in a high temperature bath (bath temperature, 476° F.). A tube of untreated liquid polybutadiene was heated in a similar manner. Temperature readings were taken at various time intervals from a thermometer immersed in the polymer. Results are shown below and also in FIGURE 1.

| Liquid Polybutadiene, Propane Extracted | | Liquid Polybutadiene, Untreated | |
|---|---|---|---|
| Minutes | ° F. | Minutes | ° F. |
| 1 | 177 | 0.5 | 119 |
| 2 | 180 | 2 | 140 |
| 3 | 194 | 4 | 225 |
| 4 | 236 | 5 | 260 |
| 5 | 274 | 6 | 293 |
| 6 | 301 | 7 | 315 |
| 7 | 325 | 8 | 338 |
| 8 | 342 | 10 | 375 |
| 10 | 376 | 12 | 401 |
| 15 | 443 | 15 | 432 |
| 20 | 478 | 20 | 465 |
| 25 | 529 | 25 | 487 |
| 28 | 750 | 30 | 505 |
| 30 | 685 | 35.5 | 513 |
| 35 | 538 | 40 | 511 |
| | | 45 | 505 |
| | | 50 | 496 |

Figure 1:
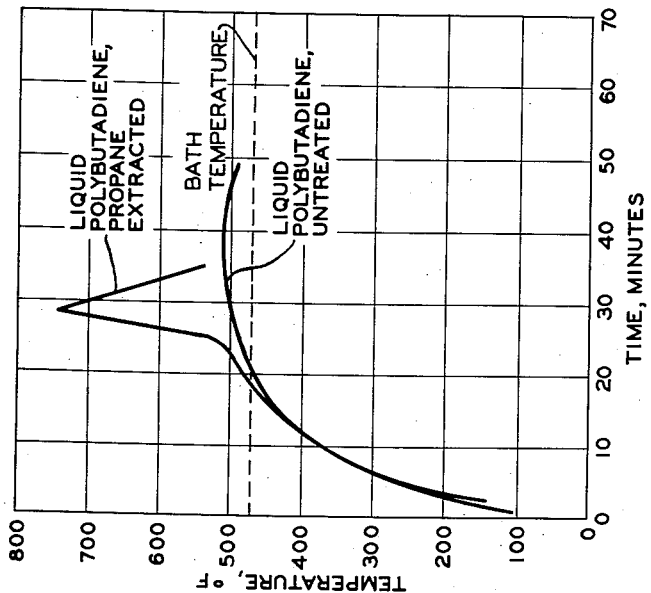

A solid product was obtained in each case. There was no evidence of voids in the resin prepared from the propane extracted sample while many voids were observed in the solid product prepared from untreated liquid polybutadiene. Reference to FIGURE 1 shows that the time required for the resin to increase in temperature from 400 to 500° F. was 11 minutes in the case of the propane extracted sample and 16 minutes in the case of the untreated sample, thus indicating that the propane treated material was much more active. This figure also shows that the activity of the treated polymer was much greater than that of the untreated material. For example, that portion of the curve above the line labeled bath temperature is due to the heat of reaction during the setting of the polymer. It is clearly shown that a much higher temperature is obtained, indicating greater amount of heat given off, during the setting of the treated material. That is, a great deal more heat was evolved from the propane treated material during the reaction period than was evolved from the untreated sample.

*Example II*

Liquid polybutadiene, prepared by mass polymerization using finely divided sodium as a catalyst, and having a viscosity of 1360 Saybolt Furol seconds at 100° F., and a Gardner color of 11, was fractionated by liquid-liquid propane extraction using the method described in Example I. Two runs were made. Operating conditions, yield and inspection data on products and charge are shown below:

| | Run 1 | Run 2 |
|---|---|---|
| Operating Conditions: | | |
| Feed rates, gallons per hour at 60° F.— | | |
| Propane | 14.0 | 14.0 |
| Polybutadiene | 0.495 | 0.479 |
| Ratio, Propane/Polybutadiene, volume | 28.3/1 | 29.2/1 |
| Temperatures, ° F.— | | |
| Top column | 108 | 74 |
| Polybutadiene inlet | 96 | 75 |
| Column at propane inlet | 108 | 75 |
| Propane inlet | 108 | 74 |
| Bottom settling section | 108 | 77 |
| Column pressure, p.s.i.g. | 250 | 250 |
| Inspection Data: | | |
| Refractive Index, 70° C. (Solvent-free basis)— | | |
| Charge | 1.4996 | 1.4996 |
| Overhead | 1.4955 | 1.4977 |
| Bottoms | 1.5048 | 1.5043 |
| Yield, volume percent raffinate (calculated from refractive index) | 44.1 | 28.8 |

A sample of the raffinate from each run was placed under vacuum (approximately 10 mm. Hg) and warmed to 160–175° F. for 30 minutes to remove any volatile matter which remained. The material was placed in tubes and heated in a high temperature bath (bath temperature, 476° F.). A tube of untreated liquid polybutadiene was heated in a similar manner. Temperature readings on the polymer were taken at various time intervals. Results are shown below and also in FIGURE 2.

| Run 1 | | Run 2 | | Liquid Polybutadiene, Untreated | |
|---|---|---|---|---|---|
| Minutes | ° F. | Minutes | ° F. | Minutes | ° F. |
| 2 | 107 | 2 | 102 | 2 | 101 |
| 3 | 133 | 4 | 203 | 4 | 187 |
| 4 | 157 | 6 | 270 | 6 | 267 |
| 5 | 194 | 8 | 324 | 8 | 320 |
| 6 | 254 | 10 | 365 | 10 | 358 |
| 7 | 295 | 12 | 397 | 12 | 391 |
| 9 | 349 | 14 | 420 | 14 | 415 |
| 11 | 376 | 16 | 440 | 16 | 434 |
| 14 | 415 | 18 | 456 | 18 | 447 |
| 17 | 439 | 20 | 471 | 20 | 459 |
| 20 | 461 | 21 | 478 | 22 | 468 |
| 23 | 499 | 22 | 487 | 24 | 478 |
| 25 | 531 | 23 | 493 | 26 | 487 |
| 27 | 597 | 24 | 509 | 28 | 495 |
| 29.25 | 762 | 25 | 523 | 30 | 503 |
| 30 | 741 | 26 | 545 | 32 | 513 |
| 31 | 714 | 27 | 585 | 34 | 517 |
| 32 | 665 | 27.5 | 678 | 36 | 522 |
| 33 | 626 | 28 | 827 | 38 | 525 |
| 34 | 597 | 28.5 | 835 | 40 | 525 |
| 35 | 575 | 29 | 822 | | |
| | | 30.25 | 746 | | |
| | | 31 | 706 | | |
| | | 32 | 663 | | |
| | | 33 | 631 | | |
| | | 34 | 606 | | |
| | | 35 | 586 | | |

A solid product was obtained in each case. Reference to FIGURE 2 shows that the time required for the resin from Run 1 (56 percent of total material removed) to increase in temperature from 400 to 500° F. was 10.5 minutes and Run 2 the time required for a corresponding temperature increase was 11 minutes. Sixteen minutes was required for the same temperature increase in the sample of untreated liquid polybutadiene. These data demonstrate the propane extracted liquid polybutadiene was much more active than the untreated material. This figure also shows that the activity of the treated polymer was much greater than that of the untreated material. For example, that portion of the curve above the line labeled bath temperature is due to the heat of reaction during the setting of the polymer. It is clearly shown that a much higher temperature is obtained, indicating greater amount of heat given off, during the setting of the treated material. Much more heat was evolved from the two propane treated samples than from the untreated sample.

I claim:

1. A process for preparing void-free castings from a liquid polymer selected from the group consisting of homopolymers of conjugated dienes having 4–8 carbon atoms per molecule and copolymers of conjugated dienes having 4–8 carbon atoms per molecule and ethylenically unsaturated monomers copolymerizable therewith, said method comprising contacting said liquid polymer in liquid-liquid extractive relationship with a liquid solvent selected from the group consisting of paraffins containing 1 to 5 carbon atoms per molecule and monoolefins containing 1 to 5 carbon atoms so as to extract 1 to 75 volume percent of said polymer, recovering a raffinate and an extract phase; removing solvent from said raffinate phase; preparing a casting from the solvent free raffinate phase, and curing said castings.

2. A method of preparing a polymer having improved gelling characteristics from a liquid polymer selected from the group consisting of homopolymers of conjugated dienes having 4–8 carbon atoms per molecule and copolymers of conjugated dienes having 4–8 carbon atoms per molecule and ethylenically unsaturated monomers copolymerizable therewith, said method comprising contacting said liquid polymer with a liquid selected from the group consisting of paraffins containing 1 to 5 carbon atoms per molecule and monoolefins containing 1 to 5 carbon atoms per molecule under liquid-liquid extraction conditions, separating the resulting mixture into a raffinate and an extract phase, said extract phase containing from 15 to 35 volume percent of said polymer and recovering the polymer having improved gelling properties from said raffinate phase.

3. A method of treating a liquid polymer selected from the group consisting of homopolymers of conjugated dienes having 4–8 carbon atoms per molecule and copolymers of conjugated dienes having 4–8 carbon atoms per molecule and ethylenically unsaturated monomers copolymerizable therewith, said method comprising extracting 1 to 75 volume percent of said polymer by contacting same under liquid-liquid extraction conditions with a liquid hydrocarbon of 1 to 5 carbon atoms per molecule selected from the group consisting of paraffins and monoolefins, separating the resulting admixture into a raffinate phase and an extract phase, and recovering polymer from said raffinate phase.

4. A process for preparing void-free castings from a liquid polymer selected from the group consisting of homopolymers of conjugated dienes having 4–8 carbon atoms per molecule and copolymers of conjugated dienes having 4–8 carbon atoms per molecule and ethylenically unsaturated monomers copolymerizable therewith comprising contacting said liquid polymer with sufficient liquid hydrocarbon in liquid-liquid extraction relationship so as to extract 1 to 75 volume percent of said polymer, said liquid hydrocarbon being selected from the group consisting of paraffins containing 1 to 5 carbon atoms per molecule and monoolefins containing 1 to 5 carbon atoms per molecule; recovering a raffinate phase and an extract phase stripping solvent from said raffinate phase; heating resulting stripped raffinate at a temperature in the range of 160–175° F., at a pressure of 5 to 20 millimeters of mercury, and for a period of 15 minutes to one hour; casting thus treated raffinate in a suitable mold and heating the cast polymer at a temperature in the range of 340 to 540° F. until solidified.

5. A process for preparing void-free castings from a liquid polymer selected from the group consisting of homopolymers of conjugated dienes having 4–8 carbon atoms per molecule and copolymers of conjugated dienes having 4–8 carbon atoms per molecule and ethylenically unsaturated monomers copolymerizable therewith comprising contacting said liquid polymer with sufficient liquid hydrocarbon in liquid-liquid extraction relationship so as to extract 15 to 35 volume percent of said polymer, said liquid hydrocarbon being selected from the group consisting of paraffins containing 1 to 5 carbon atoms per molecule and monoolefins containing 1 to 5 carbon atoms per molecule; recovering a raffinate phase and an extract phase; stripping solvent from said raffinate phase; heating resulting stripped raffinate phase at a temperature in the range of 160 to 175° F., at a pressure in the range of 5 to 20 millimeters of mercury for a time in the range of 15 minutes to one hour; casting the thus prepared polymer in a suitable mold and heating the cast polymer at a temperature in the range of 420–540° F. for a period of time in the range between 2 and 10 hours.

6. A process according to claim 5 wherein the conjugated diene is selected from the group of conjugated dienes containing 4 to 6 carbon atoms per molecule.

7. The process of claim 5 wherein the conjugated diene is 1,3-butadiene.

8. The process of claim 7 wherein the liquid hydrocarbon is butane.

9. The process of claim 7 wherein the liquid hydrocarbon is propane.

10. The process of claim 7 wherein the liquid hydrocarbon is pentane.

11. The process of claim 4 wherein the liquid polymer is a copolymer of 1,3-butadiene and styrene.

References Cited in the file of this patent

UNITED STATES PATENTS

| | | |
|---|---|---|
| 1,901,045 | Schmidt | Mar. 14, 1933 |
| 2,557,641 | Dudley | June 19, 1951 |
| 2,631,175 | Crouch | Mar. 10, 1953 |
| 2,683,139 | Leary et al. | July 6, 1954 |
| 2,701,780 | Nelson et al. | Feb. 8, 1955 |
| 2,772,254 | Gleason et al. | Nov. 27, 1956 |

OTHER REFERENCES

Brown: "Unit Operations," John Wiley & Sons Inc., New York, 1950, page 297.